United States Patent
Jung et al.

(10) Patent No.: US 12,259,545 B2
(45) Date of Patent: Mar. 25, 2025

(54) OPTICAL APPARATUS

(71) Applicant: LG INNOTEK CO., LTD., Seoul (KR)

(72) Inventors: Jae Wook Jung, Seoul (KR); In Kyu Lee, Seoul (KR); Woo Jin Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 568 days.

(21) Appl. No.: 17/626,032

(22) PCT Filed: Jul. 10, 2020

(86) PCT No.: PCT/KR2020/009094
§ 371 (c)(1),
(2) Date: Jan. 10, 2022

(87) PCT Pub. No.: WO2021/006694
PCT Pub. Date: Jan. 14, 2021

(65) Prior Publication Data
US 2022/0252863 A1 Aug. 11, 2022

(30) Foreign Application Priority Data

Jul. 10, 2019 (KR) .................. 10-2019-0083164
Jul. 17, 2019 (KR) .................. 10-2019-0086457

(51) Int. Cl.
*G02B 26/08* (2006.01)
*G02B 27/14* (2006.01)
(Continued)

(52) U.S. Cl.
CPC ......... *G02B 26/0816* (2013.01); *G02B 27/14* (2013.01); *G03B 9/08* (2013.01); *G03B 11/00* (2013.01); *G03B 30/00* (2021.01)

(58) Field of Classification Search
CPC .. G02B 26/0816; G02B 27/14; G02B 13/009; G02B 15/06; G02B 13/001; G02B 3/14;
(Continued)

(56) References Cited

U.S. PATENT DOCUMENTS

2016/0316150 A1 10/2016 Eromaki
2017/0353638 A1* 12/2017 Konttori ................ G03B 17/00

FOREIGN PATENT DOCUMENTS

KR 10-2005-0051861 A 6/2005
KR 10-2011-0099983 A 9/2011
(Continued)

OTHER PUBLICATIONS

Office Action dated Oct. 11, 2023 in Korean Application No. 10-2019-0086457.
(Continued)

*Primary Examiner* — Euncha P Cherry
(74) *Attorney, Agent, or Firm* — Saliwanchik, Lloyd & Eisenschenk

(57) ABSTRACT

An embodiment of the present invention relates to an optical apparatus comprising: a first main body including first cover glass; a second main body including second cover glass and foldably connected to the first main body; a first optical module arranged in the first main body; and a second optical module which is arranged in the second main body and which overlaps with the first optical module in the optical axis direction when the first cover glass and the second cover glass are facing each other.

20 Claims, 12 Drawing Sheets

(51) Int. Cl.
  *G03B 9/08* (2021.01)
  *G03B 11/00* (2021.01)
  *G03B 30/00* (2021.01)

(58) Field of Classification Search
  CPC . G02B 7/02; G02B 7/09; G02B 13/00; G03B 9/08; G03B 11/00; G03B 30/00; G03B 17/565; G06F 1/1616; G06F 1/1652; G06F 1/1686; H04M 1/02
  See application file for complete search history.

(56) References Cited

FOREIGN PATENT DOCUMENTS

| KR | 10-2016-0019280 A | 2/2016 |
| KR | 10-2016-0034660 A | 3/2016 |
| KR | 10-2017-0079545 A | 7/2017 |
| KR | 10-2017-0082926 A | 7/2017 |

OTHER PUBLICATIONS

International Search Report dated Oct. 6, 2020 in International Application No. PCT/KR2020/009094.

* cited by examiner

OPTICAL APPARATUS

CROSS-REFERENCE TO RELATED APPLICATIONS

This application is the U.S. national stage application of International Patent Application No. PCT/KR2020/009094, filed Jul. 10, 2020, which claims the benefit under 35 U.S.C. § 119 of Korean Application Nos. 10-2019-0083164, filed Jul. 10, 2019; and 10-2019-0086457, filed Jul. 17, 2019; the disclosures of each of which are incorporated herein by reference in their entirety.

TECHNICAL FIELD

The present embodiment relates to an optical apparatus.

BACKGROUND ART

The content described below provides background information on the present embodiment and does not describe the prior art.

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture. Meanwhile, as various types of additional devices are installed in recent camera modules, there is a demand for miniaturization of the camera module.

DETAILED DESCRIPTION OF THE INVENTION

Technical Subject

An object to be solved by the first embodiment of the present invention is to provide an optical apparatus capable of realizing a slim outer appearance through miniaturization of a camera module.

An object to be solved by the second embodiment of the present invention is to provide an optical apparatus capable of reducing the thickness thereof.

Technical Solution

An optical apparatus according to a first embodiment of the present invention for achieving the above object comprises: a first main body comprising first cover glass; a second main body comprising second cover glass and foldably connected to the first main body; a first optical module disposed in the first main body; and a second optical module which is disposed in the second main body and which overlaps with the first optical module in the optical axis direction when the first cover glass and the second cover glass are facing each other.

In addition, the first optical module comprises a first lens unit, the second optical module may comprise a second lens unit being overlapped with the first lens unit in an optical axis direction, and an image sensor disposed at one side of the second lens unit.

In addition, the first optical module may comprise: a shutter disposed under the first lens unit; a first beam splitter disposed under the shutter; a third lens unit spaced apart from the first lens unit in a direction perpendicular to the optical axis direction; and a second beam splitter disposed on one side of the third lens unit.

In addition, the first optical module may comprise a first driving unit that turns on or off the shutter, and a second driving unit that rotates a reflective surface of the second beam splitter.

In addition, when the shutter is on and the reflective surface of the second beam splitter does not face the first beam splitter, the light passing through the first lens unit is incident on the second lens unit, and when the shutter is turned off and the reflective surface of the second beam splitter faces the third lens unit and the first beam splitter, a light passing through the third lens unit may be incident on the second lens unit.

In addition, the first optical module may comprise a fourth lens unit spaced apart from the first and third lens units in a direction perpendicular to the optical axis, and a first reflecting unit disposed at one side of the fourth lens unit.

In addition, the first optical module may comprise a third driving unit that rotates the first reflecting unit.

In addition, when the shutter is on, the reflective surface of the second beam splitter does not face the first beam splitter, and the reflective surface of the first reflecting unit does not face the first beam splitter, a light passing through the first lens unit is incident on the second lens unit; when the shutter is off, the reflective surface of the second beam splitter faces the third lens unit and the first beam splitter, and the reflective surface of the first reflecting unit does not face the first beam splitter, a light passing through the third lens unit is incident on the second lens unit; and when the shutter is turned off, the reflective surface of the second beam splitter does not face the first beam splitter, and the reflective surface of the first reflecting unit faces the fourth lens unit and the first beam splitter, a light passing through the fourth lens unit may be incident on the second lens unit.

In addition, the first optical module may comprise: a shutter disposed under the first lens unit; a first driving unit for turning on or off the shutter; a fifth lens unit spaced apart from the first lens unit in a direction perpendicular to the optical axis; a second reflecting unit disposed on one side of the fifth lens unit; a fourth driving unit for rotating the second reflecting unit; sixth and seventh lens units disposed between the first lens unit and the fifth lens unit; and fifth and sixth driving units for moving the sixth and seventh lens units in a direction perpendicular to the optical axis, respectively.

In addition, when the shutter is turned on and the reflective surface of the second reflecting unit does not face the first beam splitter, a light passing through the first lens unit is incident on the second lens unit; and when the shutter is turned off and the reflective surface of the second reflecting unit faces the fifth lens unit and the first beam splitter, a light passing through the fifth lens unit may sequentially pass through the sixth and seventh lens units to be incident on the second lens unit.

In addition, the first optical module comprises: a shutter disposed under the first lens unit; a first driving unit for turning on or off the shutter; a fifth lens unit spaced apart from the first lens unit in a direction perpendicular to the optical axis; a second reflecting unit disposed on one side of the fifth lens unit; a fourth driving unit for rotating the second reflecting unit; and sixth and seventh lens units disposed between the first lens unit and the fifth lens unit, wherein the sixth and seventh lens units may be liquid lenses.

In addition, when the shutter is turned on and the reflective surface of the second reflecting unit does not face the first beam splitter, a light passing through the first lens unit is incident on the second lens unit; and when the shutter is turned off and the reflective surface of the second reflecting unit faces the fifth lens unit and the first beam splitter, a light passing through the fifth lens unit may sequentially pass through the sixth and seventh lens units to be incident on the second lens unit.

In addition, it may comprise a stray light blocking member disposed between the first cover glass and the second cover glass.

In addition, it may comprise a seating groove formed in at least one of the first cover glass and the second cover glass, in which at least a portion of the stray light blocking member is being seated.

In addition, it may comprise a protruded portion being protruded from at least one of the first cover glass and the second cover glass.

In addition, it may comprise: a protruded portion being protruded from one of the first cover glass and the second cover glass; and a seating groove formed in the other one of the first cover glass and the second cover glass, in which the protruded portion is seated.

In addition, a region of the first cover glass being overlapped with the first lens unit in an optical axis direction may have a refractive index, and a region of the second cover glass being overlapped with the second lens unit in an optical axis direction may have a refractive index.

An optical apparatus according to a second embodiment of the present invention for achieving the above object comprises: a main body comprising an upper surface, a lower surface, and first to fourth side surfaces connecting the upper and lower surfaces, and foldable with respect to an imaginary surface parallel to the first side surface; a display disposed on the upper surface of the main body and foldable with respect to the imaginary surface; and a camera module comprising a lens unit disposed on the main body and exposed to a first side surface of the main body or a third side surface facing the first side surface.

In addition, the main body and the display may be folded down with respect to the imaginary surface.

In addition, the camera module may be disposed adjacent to a corner region of the main body.

In addition, the camera module may be extended from a first side surface or a third side surface facing the first side surface in a direction perpendicular to the imaginary surface.

In addition, the lengths of the first side surface and the third side surface may be longer than the lengths of the second side surface and the fourth side surface.

In addition, the lengths of the first side surface and the third side surface may be shorter than the lengths of the second side surface and the fourth side surface.

An optical apparatus according to an aspect of the present invention for achieving the above object comprises: a main body comprising one surface, the other surface, and a plurality of side surfaces connecting the one surface and the other surface and foldable; a display disposed on one surface of the main body and out foldable; and a camera module comprising a lens part disposed in a direction perpendicular to an imaginary line on which the display is folded and exposed to one of the plurality of side surfaces.

In addition, the camera module may be disposed adjacent to a corner region of the main body.

In addition, a surface being exposed to the outside of the lens unit may be parallel to the imaginary line.

Advantageous Effects

Through the first embodiment of the present invention, it is possible to provide an optical apparatus capable of realizing a slim outer appearance through miniaturization of a camera module.

Through the first embodiment of the present invention, it is possible to provide an optical apparatus capable of reducing the thickness thereof.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

The 'optical axis direction' used below is defined as the optical axis direction of the first optical module and the optical axis direction of the second optical module. Meanwhile, the 'optical axis direction' may correspond to an 'up-down direction', a 'z-axis direction', and the like.

Hereinafter, an optical apparatus according to a first embodiment of the present invention will be described with reference to the drawings.

Figure 1:
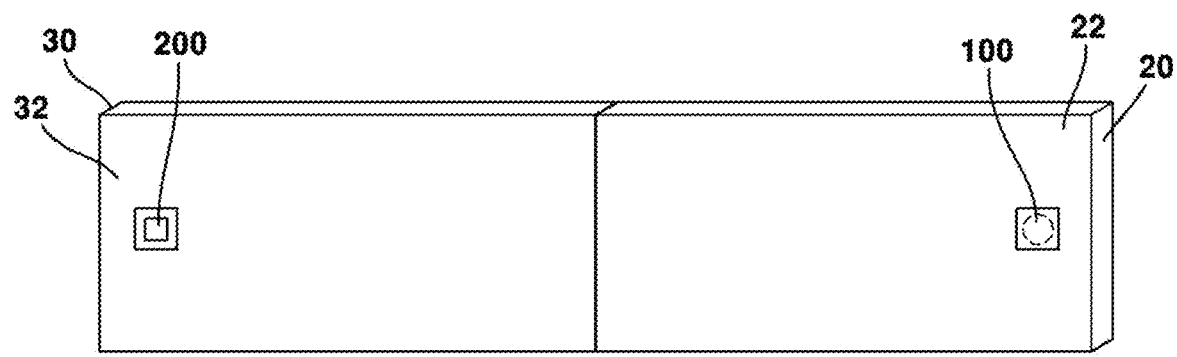
FIGS. 1 and 2 are perspective views of an optical apparatus according to a first embodiment of the present invention.
Figure 2:
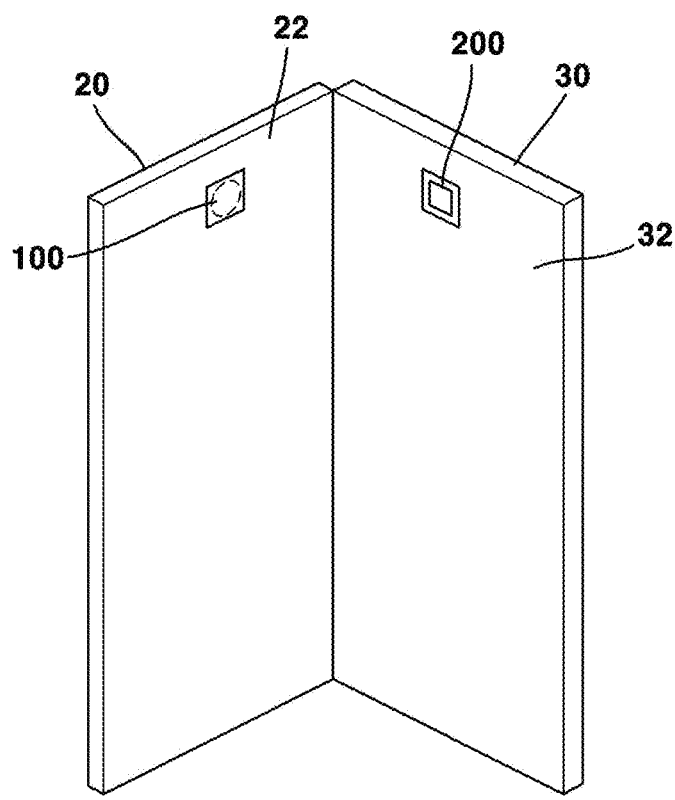
Figure 3:
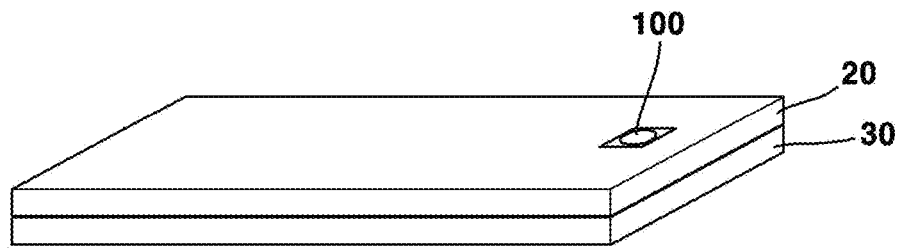
FIG. 3 is a view showing a folded state of the optical apparatus of FIGS. 1 and 2.
Figure 4:
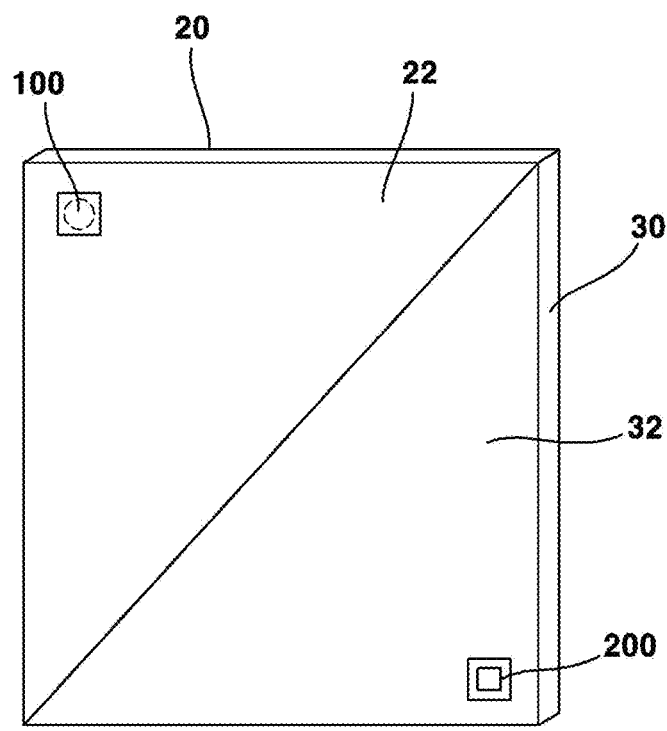
FIG. 4 is a perspective view of an optical apparatus according to a first embodiment of the present invention.
Figure 5:
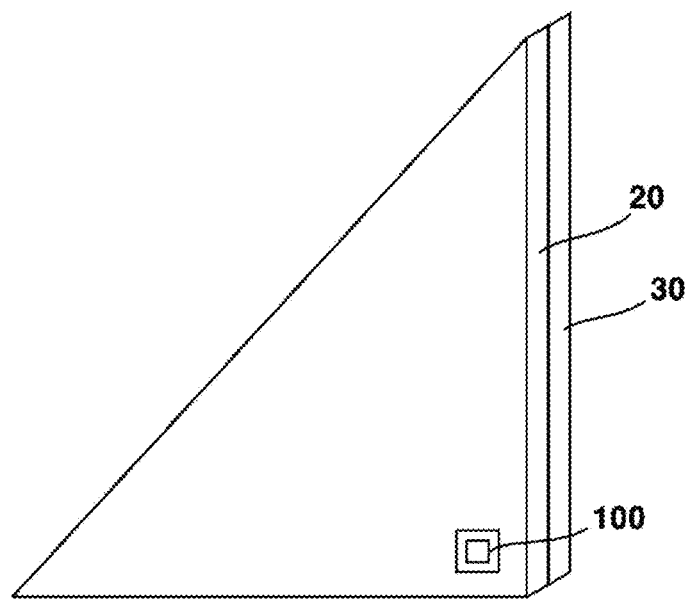
FIG. 5 is a view showing a state in which the optical apparatus of FIG. 4 is folded.
Figure 6:
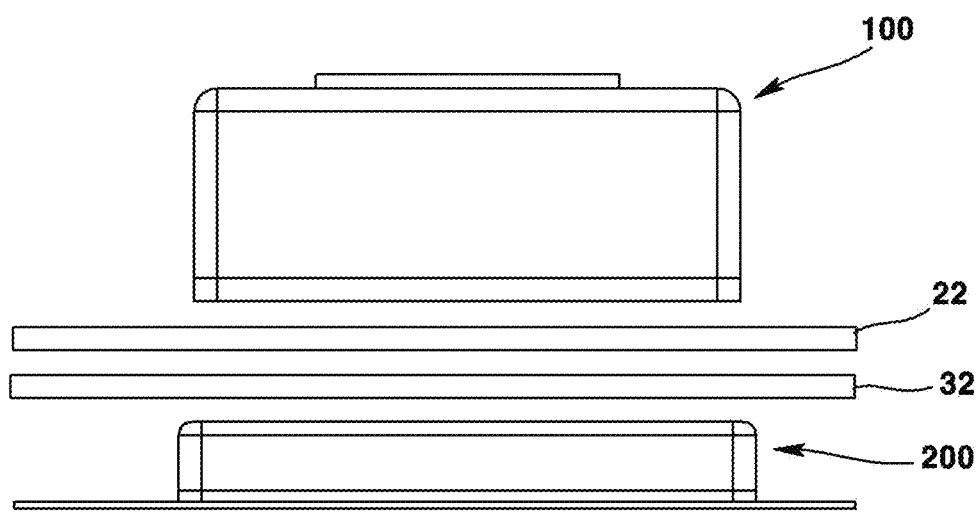
FIG. 6 is a side surface view of an optical apparatus with some components removed from FIG. 2.
Figure 7:
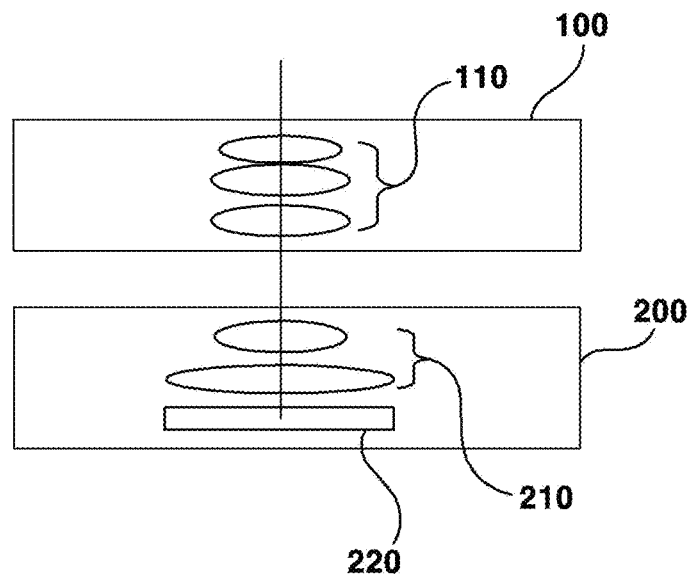
FIG. 7 is a cross-sectional view of some components of an optical apparatus according to a first embodiment of the present invention.
Figure 8:
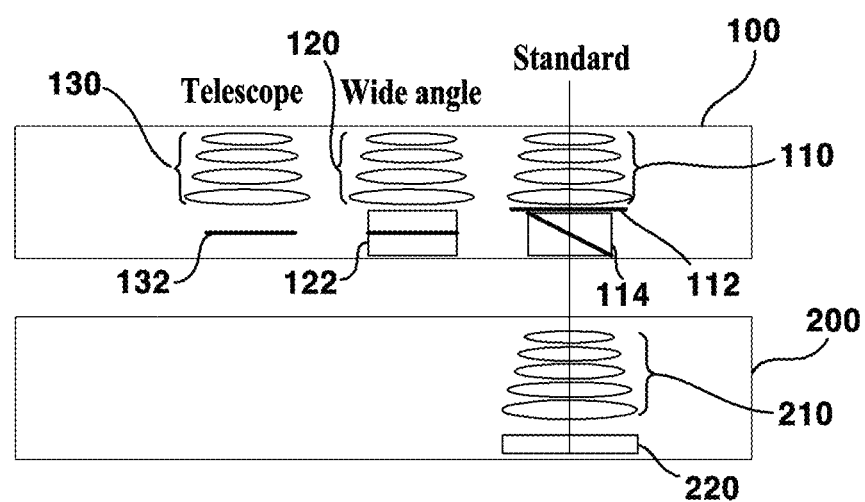
FIGS. 8 to 10 are cross-sectional views of some components of an optical apparatus according to a modified embodiment of the present invention.
Figure 9:
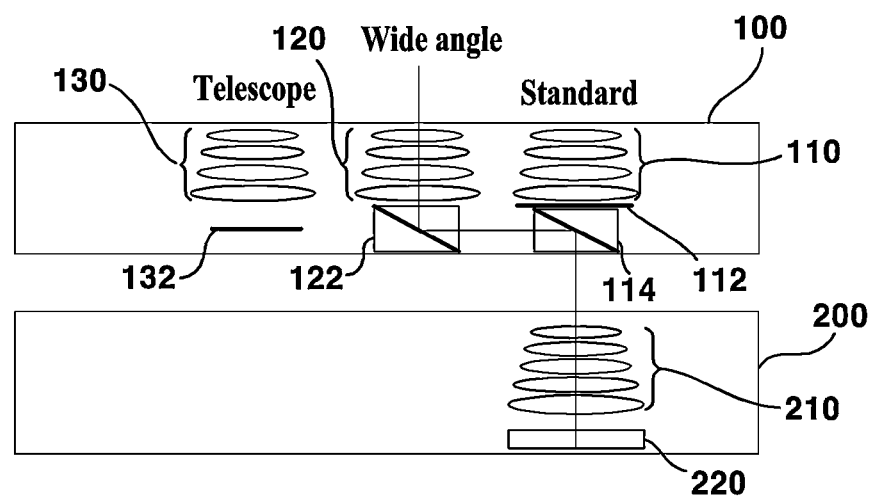
Figure 10:
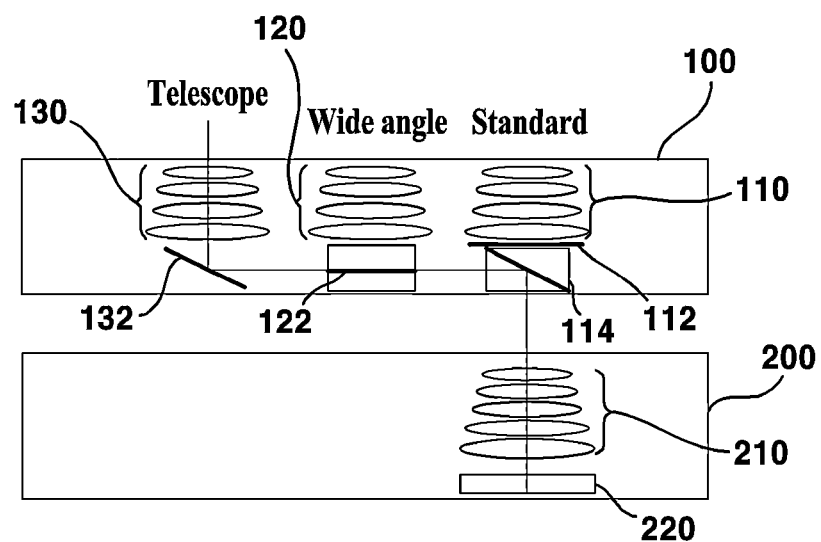
Figure 11:
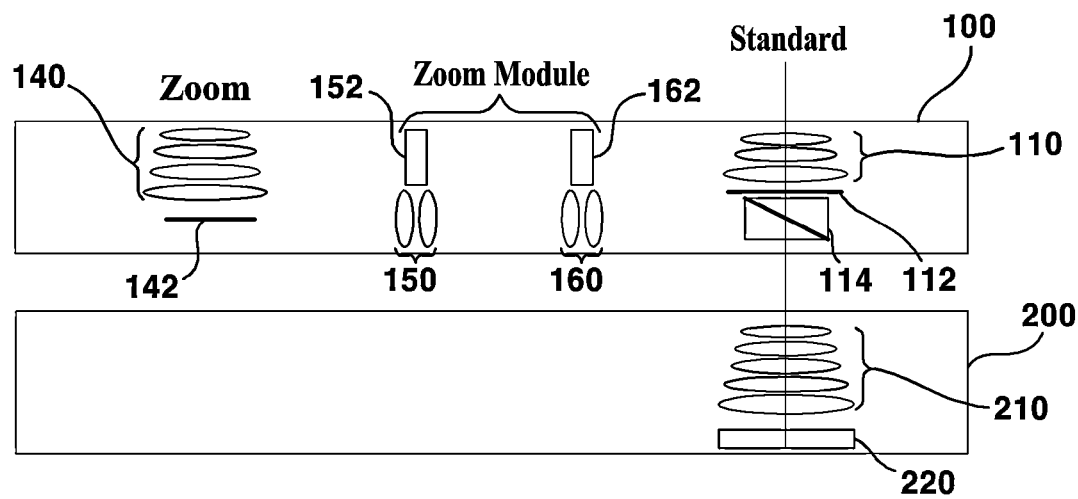
FIGS. 11 and 12 are cross-sectional views of some components of an optical apparatus according to another modified embodiment of the present invention.
Figure 12:
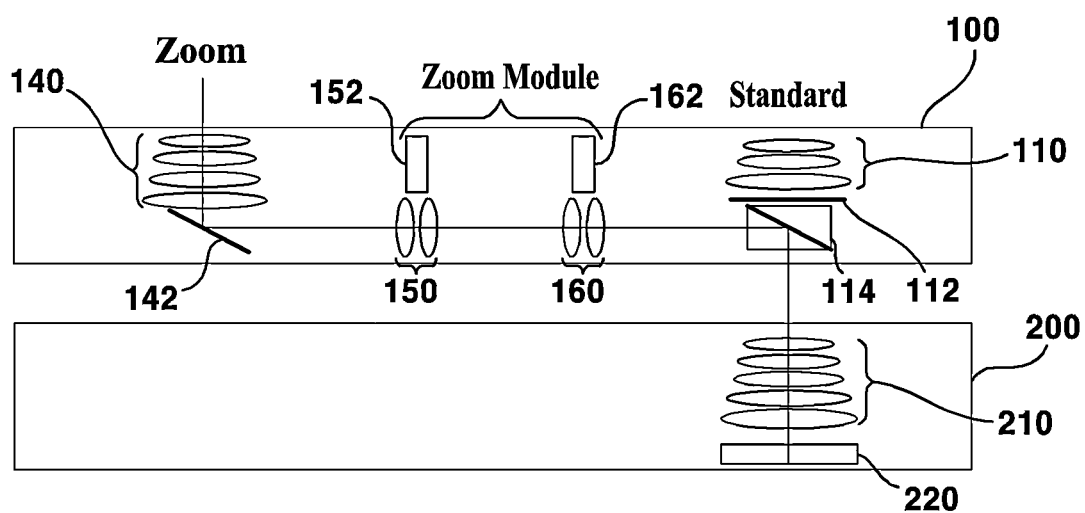
Figure 13:
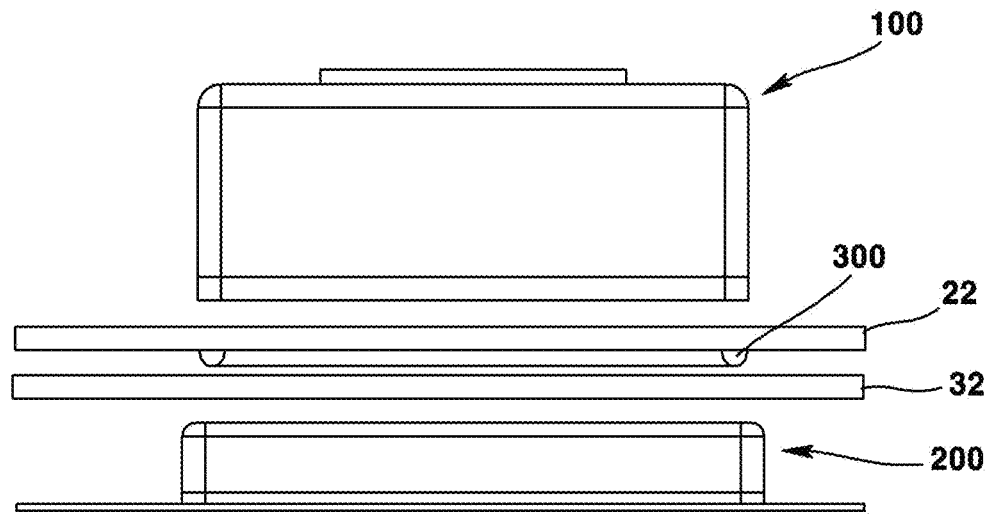
FIGS. 13 to 15 are modified embodiments of FIG. 6.
Figure 14:
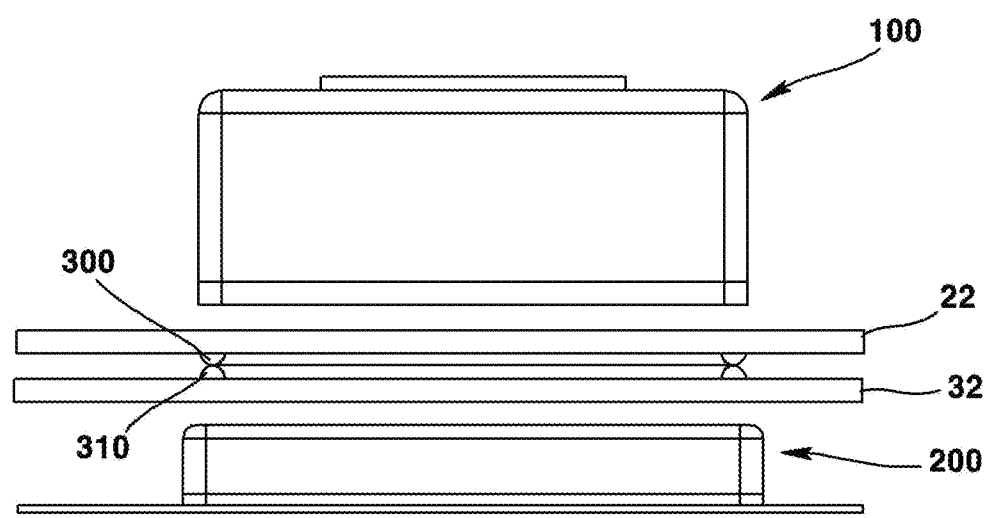
Figure 15:
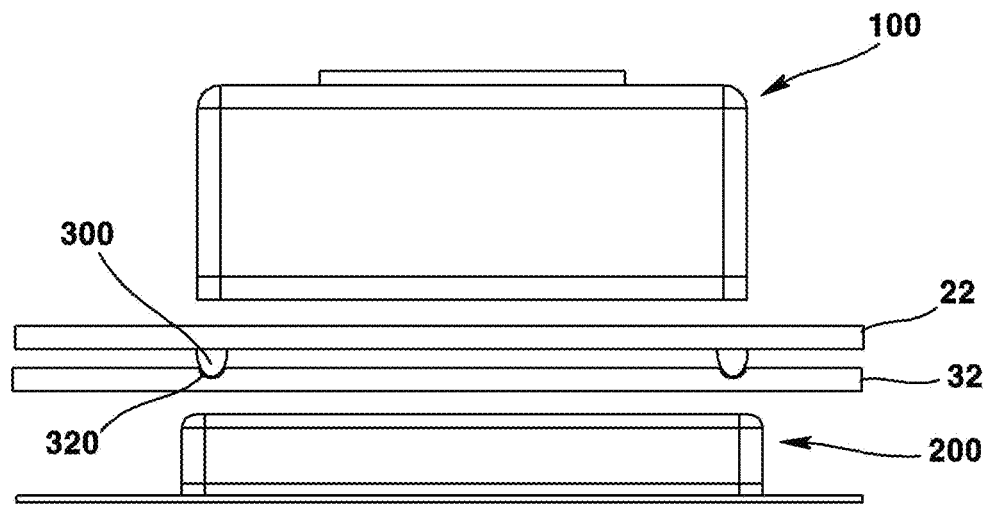

FIGS. 1 and 2 are perspective views of an optical apparatus according to a first embodiment of the present invention. FIG. 3 is a view showing a folded state of the optical apparatus of FIGS. 1 and 2. FIG. 4 is a perspective view of an optical apparatus according to a first embodiment of the present invention. FIG. 5 is a view showing a state in which the optical apparatus of FIG. 4 is folded. FIG. 6 is a side surface view of an optical apparatus with some components removed from FIG. 2. FIG. 7 is a cross-sectional view of some components of an optical apparatus according to a first embodiment of the present invention. FIGS. 8 to 10 are cross-sectional views of some components of an optical apparatus according to a modified embodiment of the present invention. FIGS. 11 and 12 are cross-sectional views of some components of an optical apparatus according to another modified embodiment of the present invention. FIGS. 13 to 15 are modified embodiments of FIG. 7.

An optical apparatus 10 will be described with reference to FIGS. 1 to 5.

The optical apparatus 10 may be one among a hand phone, a mobile phone, a smart phone, a portable smart device, a digital camera, a laptop computer, a digital broadcasting terminal, a personal digital assistant (PDA), a portable multimedia player (PMP), and a navigation device. However, the type of the optical apparatus 10 is not limited thereto, and any device for photographing an image or a picture may be comprised in the optical apparatus 10.

The optical apparatus 10 may comprise main bodies 20 and 30. The main bodies 20 and 30 may form the outer appearance of the optical apparatus 10. The main bodies 20 and 30 may be foldable. A display unit may be disposed on one surface of the main bodies 20 and 30. The main bodies 20 and 30 may comprise a first main body 20 and a second main body 30. The first main body 20 and the second main body 30 may be foldably connected. The component in which the first main body 20 and the second main body 30 are foldably connected may comprise components applicable to those skilled in the art of the present invention.

A display unit and cover glasses 22 and 32 may be disposed on one surface of the main bodies 20 and 30. A first display unit and a first cover glass 22 may be disposed on one surface of the first main body 20. A second display unit and a second cover glass 32 may be disposed on one surface of the second main body 30. The first display unit and the second display unit may be integrally formed. The first display unit and the second display unit may be foldable. The first display unit and the second display unit are foldable. The first cover glass 22 and the second cover glass 32 may be integrally formed. The first cover glass 22 and the second cover glass 32 may be foldable. The first cover glass 22 and the second cover glass 32 may be folded. A first display unit may be disposed inside the first cover glass 22. A second display unit may be disposed in the second cover glass 32. The display unit may output an image photographed by the camera module. When the main bodies 20 and 30 are foldable so that the first main body 20 and the second main body 30 face each other, the first cover glass 22 and the second cover glass 32 face each other, and the first optical module 100 and the second optical module 200 may face each other.

A region of the first cover glass 22 being overlapped with at least one among the first, and third to seventh lens units 110, 120, 130, 140, 150, and 160 in an optical axis direction may have a refractive index. In addition, a region of the second cover glass 22 being overlapped with the second lens unit 210 in an optical axis direction may have a refractive index. Through this, the efficiency of refraction of the light passing through the optical apparatus 10 may be enhanced.

Referring to FIGS. 1 and 3, the first main body 20 and the second main body 30 may be folded in a first direction; referring to FIGS. 2 and 3, the first main body 20 and the second main body 30 may be folded in a second direction perpendicular to the first direction; and referring to FIGS. 4 and 5, the first main body 20 and the second main body 30 may be folded in a diagonal direction. However, this is only an example, and the direction in which the first main body 20 and the second main body 30 are foldable may be variously changed.

The main bodies 20 and 30 may accommodate the camera module. The camera module may comprise a first optical module 100 and a second optical module 200. The first optical module 100 may be disposed on the first main body 20. The first optical module 100 may be formed penetrating through the first main body 20. One surface of the first optical module 100 may be disposed on one surface of the first main body 20, and the other surface of the first optical module 100 may be disposed on the other surface of the first main body 20. The second optical module 200 may be disposed on the second main body 30. The second optical module 200 may be formed penetrating through the second main body 30. One surface of the second optical module 200 may be disposed on one surface of the second main body 30, and the other surface of the second optical module 200 may be disposed on the other surface of the second main body 30.

The optical apparatus 10 may comprise a camera module. The camera module may comprise a first optical module 100 and a second optical module 200. The first optical module 100 and the second optical module 200 may be disposed in the main bodies 20 and 30. The camera module may comprise a plurality of camera modules. The camera module may photograph an image of a subject.

The first optical module 100 and the second optical module 200 will be described with reference to FIGS. 6 to 12.

The optical apparatus 10 may comprise the first optical module 100 and the second optical module 200, but may comprise only some components of them, and additional components are not excluded.

The first optical module 100 may be disposed in the main bodies 20 and 30. The first optical module 100 may be disposed in the first main body 20. The first optical module 100 may penetrate through the first main body 20. When the main bodies 20 and 30 are foldable, the first optical module 100 may be disposed in the second optical module 200. In this case, the first optical module 100 may be overlapped with the second optical module 200 in an optical axis direction. The light passing through the first optical module 100 may be irradiated to the second optical module 200. Specifically, the light passing through the first optical module 100 may be irradiated to an image sensor 220 of the second optical module 200.

The second optical module 200 may be disposed in the main bodies 20 and 30. The second optical module 200 may be disposed in the second main body 30. The second optical module 200 may penetrate through the second main body 30. When the main bodies 20 and 30 are foldable, the second optical module 200 may be disposed below the first optical module 100. In this case, the second optical module 200 may be overlapped with the first optical module 100 in an optical axis direction. The light passing through the first optical module 100 may be irradiated to the second optical module 200.

Referring to FIG. 6, the optical apparatus 10 may further comprise a driving unit (not shown) for aligning the first optical module 100 and the second optical module 200. The driving unit may operate for AF driving and OIS driving of the first optical module 100 and/or the second optical module 200. At this time, the driving unit may be connected to the first optical module 100 and/or the second optical module 200. When the main bodies 20 and 30 are foldable, the driving unit may operate to align the optical axis of the first optical module 100 and the optical axis of the second optical module 200 which are facing each other. The driving unit may operate through electromagnetic interaction between the coil and the magnet, but is not limited thereto and may be variously changed.

Referring to FIG. 7, the first optical module 100 according to a first embodiment of the present invention comprises a first lens unit 110, and the second optical module 200 may comprise a second lens unit 210 and an image sensor 220, but additional components are not excluded.

The first optical module 100 may comprise a first lens unit 110. When the first main body 20 and the second main body 30 are foldable, the first lens unit 110 may be disposed above the second lens unit 210. At this time, the optical axis of the first lens unit 110 and the optical axis of the second lens unit 210 may be aligned. Light passing through the first lens unit 110 may be incident on the second lens unit 210. The first lens unit 110 may comprise at least one lens. In a first embodiment of the present invention, the first lens unit 110 is described to comprise three lenses as an example, but the number of lenses of the first lens unit 110 may be variously changed.

The second optical module 200 may comprise a second lens unit 210. When the first main body 20 and the second main body 30 are foldable, the second lens unit 210 may be disposed below the first lens unit 110. At this time, the optical axis of the second lens unit 210 and the optical axis of the first lens unit 110 may be aligned. Light passing through the first lens unit 110 may be incident on the second lens unit 210. The second lens unit 210 may comprise at least one lens. In a first embodiment of the present invention, the second lens unit 210 is described to comprise two lenses as an example, but the number of lenses of the second lens unit 210 may be variously changed.

The second optical module 200 may comprise an image sensor 220. The image sensor 220 may be disposed below or at one side of the second lens unit 210. The image sensor 220 may be disposed in a substrate (not shown). The image sensor 220 may be electrically connected to the substrate. For example, the image sensor 220 may be coupled to a substrate by a surface mounting technology (SMT). As another example, the image sensor 220 may be coupled to a printed circuit board by a flip chip technology. The image sensor 220 may be aligned so that the optical axis of the first lens unit 110 and the optical axis of the second lens unit 210 coincide with each other. That is, the optical axis of the image sensor 220, the optical axis of the first lens unit 110, and the optical axis of the second lens unit 210 may be aligned. Through this, the image sensor 220 may acquire the light passing through the first lens unit 110 and the second lens unit 210. The image sensor 220 may convert light irradiated to the effective image area of the image sensor 220 into an electrical signal. The image sensor 220 may be any one among a charge coupled device (CCD), a metal oxide semi-conductor (MOS), a CPD, and a CID. However, the type of the image sensor 220 is not limited thereto, and the image sensor 220 may comprise any configuration capable of converting incident light into an electrical signal.

According to a first embodiment of the present invention, the first lens unit 110 is disposed in the first optical module 100 disposed in the first main body 20, and the second lens unit 210 is disposed in the second optical module 200 disposed on the second main body 20, the second lens unit 210 disposed in the module 200 to form one camera module, so that there is an advantage in that the size of the optical apparatus 10 can be reduced.

Referring to FIGS. 8 to 10, the first optical module 100 according to a modified embodiment of the present invention may comprise a first lens unit 110, a shutter 112, a first driving unit (not shown), a first beam splitter 114, a third lens unit 120, and a second beam splitter 122, a second driving unit (not shown), a fourth lens unit 130, a first reflecting unit 132, and a third driving unit (not shown), and the second optical module 200 may comprise a second lens unit 210 and an image sensor 220, but additional components other than those are not excluded.

In the first optical module 100 and the second optical module 100 according to a modified embodiment of the present invention, the component having the same reference numerals among the first optical module 100 and the second optical module 200 according to a first embodiment may be understood as the same component.

The first optical module 100 may comprise a first lens unit 110. When the first main body 20 and the second main body 30 are foldable, the first lens unit 110 may be disposed above the second lens unit 210. At this time, the optical axis of the first lens unit 110 and the optical axis of the second lens unit 210 may be aligned. The first lens unit 110 may be overlapped with the third lens unit 120 and the fourth lens unit 130 in a direction perpendicular to the optical axis. The first lens unit 110 may comprise at least one lens. In a modified embodiment of the present invention, the first lens unit 110 is described to comprise four lenses as an example, but the number of lenses of the first lens unit 110 may be variously changed.

The first optical module 100 may comprise a shutter 112. The shutter 112 may be an aperture that adjusts the amount of light. The shutter 112 may be disposed below or at one side of the first lens unit 110. The shutter 112 may be disposed between the first lens unit 110 and the first beam splitter 114. The shutter 112 may be turned on or off by the first driving unit. When the shutter 112 is turned on, a light passing through the first lens unit 110 may be passed through. When the shutter 112 is turned off, a light passing through the first lens unit 110 may be blocked.

The first optical module 100 may comprise a first driving unit (not shown). The first driving unit may be connected to the shutter 112. The first driving unit may control ON or OFF of the shutter 112.

In a modified embodiment of the present invention, the shutter 112 is described to control ON or OFF through a first driving unit as an example, but the light passing through the first lens unit 110 may be passed through or blocked by only the shutter 112 itself without the first driving unit.

The first optical module 100 may comprise a first beam splitter 114. The first beam splitter 114 may be disposed on one side or below the shutter 112. The first beam splitter 114 may be overlapped with the second beam splitter 112 and the first reflecting unit 132 in a direction perpendicular to the optical axis. The first beam splitter 114 may pass the light passing through the shutter 112 toward the second lens unit 210. The first beam splitter 114 may reflect light passing through the second beam splitter 122 or reflected by the second beam splitter 122 toward the second lens unit 210.

The first optical module 100 may comprise a third lens unit 120. The third lens unit 120 may be spaced apart from the first lens unit 110 in a direction perpendicular to the optical axis. The third lens unit 120 may be overlapped with the first lens unit 110 and the fourth lens unit 130 in a direction perpendicular to the optical axis. The third lens unit 120 may comprise at least one lens. In a modified embodiment of the present invention, the third lens unit 120 is described to comprise four lenses as an example, is not limited thereto, and the number of lenses of the third lens unit 120 may be variously changed.

The first optical module 100 may comprise a second beam splitter 122. The second beam splitter 122 may be disposed below or at one side of the third lens unit 120. The second beam splitter 122 may be overlapped with the first beam splitter 114 in a direction perpendicular to the optical axis. The reflective surface of the second beam splitter 122 may be rotated by a second driving unit. The second beam splitter 122 may reflect the light passing through the third lens unit 120 through the first beam splitter 114. The second beam splitter 122 may pass the light reflected by the reflective surface of the first reflecting unit 132 to be directed toward the first beam splitter 144.

The first optical module 100 may comprise a second driving unit (not shown). The second driving unit may be connected to the second beam splitter 122. The second driving unit may rotate the reflective surface of the second beam splitter 122.

The first optical module 100 may comprise a fourth lens unit 130. The fourth lens unit 130 may be spaced apart from the first lens unit 110 in a direction perpendicular to the optical axis. The fourth lens unit 130 may be overlapped with the first lens unit 110 and the third lens unit 120 in a direction perpendicular to the optical axis. The fourth lens unit 130 may comprise at least one lens. In a modified embodiment of the present invention, the fourth lens unit 130 is described to comprise four lenses as an example, but is not limited thereto, and the number of lenses of the fourth lens unit 130 may be variously changed.

The first optical module 100 may comprise a first reflecting unit 132. The first reflecting unit 132 may be disposed below or at one side of the fourth lens unit 130. The first reflecting unit 132 may be overlapped with the first beam splitter 114 in a direction perpendicular to the optical axis. The first reflecting unit 132 may be rotated by a third driving unit. The first reflecting unit 132 may reflect the light passing through the fourth lens unit 130 toward the first beam splitter 114.

The first optical module 100 may comprise a third driving unit (not shown). The third driving unit may be connected to the first reflecting unit 132. The third driving unit may rotate the first reflecting unit 132.

The second optical module 200 may comprise a second lens unit 210. When the first main body 20 and the second main body 30 are foldable, the second lens unit 210 may be disposed below the first lens unit 110. At this time, the optical axis of the second lens unit 210 and the optical axis of the first lens unit 110 may be aligned. The second lens unit 210 may comprise at least one lens. In a modified embodiment of the present invention, the second lens unit 210 is described to comprise five lenses as an example, but the number of lenses of the second lens unit 210 may be variously changed.

The second optical module 200 may comprise an image sensor 220. The image sensor 220 may be disposed below or at one side of the second lens unit 210. The image sensor 220 may be disposed in a substrate (not shown). The image sensor 220 may be electrically connected to the substrate. For example, the image sensor 220 may be coupled to a substrate by a surface mounting technology (SMT). As another example, the image sensor 220 may be coupled to a printed circuit board by a flip chip technology. The image sensor 220 may be aligned so that the optical axis of the first lens unit 110 and the optical axis of the second lens unit 210 coincide with each other. That is, the optical axis of the image sensor 220, the optical axis of the first lens unit 110, and the optical axis of the second lens unit 210 may be aligned. The image sensor 220 may convert light irradiated to the effective image area of the image sensor 220 into an electrical signal. The image sensor 220 may be any one among a charge coupled device (CCD), a metal oxide semi-conductor (MOS), a CPD, and a CID. However, the type of the image sensor 220 is not limited thereto, and the image sensor 220 may comprise any component capable of converting incident light into an electrical signal.

Referring to FIG. 8, when the shutter 112 is turned on and the reflective surface of the second beam splitter 122 does not face the first beam splitter 114, the light passing through the first lens unit 110 may be incident on the second lens unit 210. At this time, the optical apparatus 10 may implement a standard (normal) mode.

In addition, referring to FIG. 8, when the shutter 112 is turned on (ON), the reflective surface of the second beam splitter 122 does not face the first beam splitter 114, and the reflective surface of the first reflecting unit 132 does not face the first beam splitter 114, the light passing through the first lens unit 110 may be incident on the second lens unit 210. At this time, the optical apparatus 10 may implement a standard (normal) mode.

Referring to FIG. 9, when the shutter 112 is turned off and the reflective surface of the second beam splitter 122 faces the third lens unit 120 and the first beam splitter 114, the light passing through the third lens unit 120 may be reflected by the first beam splitter 114 to be incident on the second lens unit 210. At this time, the optical apparatus 10 may implement a wide angle (wide) mode.

In addition, referring to FIG. 9, when the shutter 112 is off (OFF), the reflective surface of the second beam splitter 122 faces the third lens unit 120 and the first beam splitter 114, and the reflective surface of the first reflecting unit 132 does not face the first beam splitter 114, the light passing through the third lens unit 120 may be reflected by the first beam splitter 114 to be incident on the second lens unit 210. At this time, the optical apparatus 10 may implement a wide angle (wide) mode.

Referring to FIG. 10, when the shutter 112 is turned OFF, the reflective surface of the second beam splitter 122 does not face the first beam splitter 114, and the reflective surface of the first reflecting unit 132 faces the fourth lens unit 130 and the first beam splitter 114, the light passing through the fourth lens unit 130 may be sequentially reflected from the reflective surface of the first reflecting unit 132 and the first beam splitter 114 to be incident on the second lens unit 210. At this time, the optical apparatus 10 may implement a telescope mode.

In a modified embodiment of the present invention, although it has been described as an example that when a light passes through the first lens unit 110 and the second lens unit 210, a standard mode is implemented, when a light passes through the third lens unit 120 and the second lens unit 210, a wide angle mode is implemented, and when a light passes through the fourth lens unit 130 and the second lens unit 210, a telescope mode is implemented, the lens unit in which each mode is implemented may be variously changed.

According to a modified embodiment of the present invention, in a first optical module 100 disposed on the first main body 20, a first lens unit 110, a third lens unit 120, and a fourth lens unit 130 are disposed, and the second lens unit 210 is disposed in the second optical module 200 disposed on the second main body 20, thereby configuring one camera module that implements various optical modes so that there is an advantage in that the size of the optical apparatus 10 can be reduced.

Referring to FIGS. 10 and 11, the first optical module 100 according to another modified embodiment of the present invention comprises a first lens unit 110, a shutter 112, a first driving unit (not shown), a first beam splitter 114, a fifth lens unit 140, a second reflecting unit 142, a fourth driving unit (not shown), sixth and seventh lens units 150 and 160, and fifth and sixth driving units 152 and 162, wherein the second optical module 200 may comprise a second lens unit 210 and an image sensor 220, but additional components other than those are not excluded.

In a first optical module 100 and a second optical module 200 according to another modified embodiment of the present invention, a component having the same reference numerals among the first optical module 100 and the second optical module 200 according to a first embodiment and/or a modified embodiment may be understood as the same component.

The first optical module 100 may comprise a first lens unit 110. When the first main body 20 and the second main body 30 are foldable, the first lens unit 110 may be disposed above the second lens unit 210. At this time, the optical axis of the first lens unit 110 and the optical axis of the second lens unit 210 may be aligned. The first lens unit 110 may be overlapped with the fifth lens unit 140 in a direction perpendicular to the optical axis. The first lens unit 110 may comprise at least one lens. In a modified embodiment of the present invention, the first lens unit 110 is described to comprise four lenses as an example, but the number of lenses of the first lens unit 110 may be variously changed.

The first optical module 100 may comprise a shutter 112. The shutter 112 may be an aperture that adjusts the amount of light. The shutter 112 may be disposed below or at one side of the first lens unit 110. The shutter 112 may be disposed between the first lens unit 110 and the first beam splitter 114. The shutter 112 may be turned on or off by the first driving unit. When the shutter 112 is turned on, a light passing through the first lens unit 110 may be passed through. When the shutter 112 is turned off, a light passing through the first lens unit 110 may be blocked.

The first optical module 100 may comprise a first driving unit (not shown). The first driving unit may be connected to the shutter 112. The first driving unit may control ON or OFF of the shutter 112.

In another modified embodiment of the present invention, the shutter 112 is described to control ON or OFF through a first driving unit as an example, but the light passing through the first lens unit 110 may be passed through or blocked by only the shutter 112 itself without the first driving unit.

The first optical module 100 may comprise a first beam splitter 114. The first beam splitter 114 may be disposed on one side or below the shutter 112. The first beam splitter 114 may be overlapped with the second beam splitter 142, the sixth lens unit 150, and the seventh lens unit 160 in a direction perpendicular to the optical axis. The first beam splitter 114 may pass the light passing through the shutter 112 toward the second lens unit 210. The first beam splitter 114 may reflect the light reflected from the second reflecting unit 142 and sequentially passing through the sixth lens unit 150 and the seventh lens unit 160 toward the second lens unit 210.

The first optical module 100 may comprise a fifth lens unit 140. The fifth lens unit 140 may be spaced apart from the first lens unit 110 in a direction perpendicular to the optical axis. The fifth lens unit 140 may comprise at least one lens. In another modified embodiment of the present invention, the fifth lens unit 140 is described to comprise four lenses as an example, but is not limited thereto and the number of lenses of the fifth lens unit 140 may be variously changed.

The first optical module 100 may comprise a second reflecting unit 142. The second reflecting unit 142 may be disposed below or at one side of the fifth lens unit 140. The second reflecting unit 142 may be overlapped with the first beam splitter 114, the sixth lens unit 150, and the seventh lens unit 160 in a direction perpendicular to the optical axis. The second reflecting unit 142 may be rotated by the fourth driving unit. The second reflecting unit 142 may reflect the light passing through the fifth lens unit 140 toward the first beam splitter 114.

The first optical module 100 may comprise a fourth driving unit (not shown). The fourth driving unit may be connected to the second reflecting unit 142. The fourth driving unit may rotate the second reflecting unit 142.

The first optical module 100 may comprise a sixth lens unit 150 and a seventh lens unit 160. The sixth lens unit 150 and the seventh lens unit 160 may be spaced apart from each other. The sixth lens unit 150 and the seventh lens unit 160 may be overlapped with the second reflecting unit 142 and the first beam splitter 114 in a direction perpendicular to the optical axis. Each of the sixth lens unit 150 and the seventh lens unit 160 may comprise at least one lens. In another modified embodiment of the present invention, each of the sixth lens unit 150 and the seventh lens unit 160 is described to comprise two lenses respectively as an example, but is not limited thereto, and the number of lenses of each of the sixth lens unit 150 and the seventh lens unit 160 may be variously changed.

The sixth lens unit 150 and the seventh lens unit 160 may be moved in a direction perpendicular to the optical axis by a fifth driving unit 152 and a sixth driving unit 162, respectively. Through this, it is possible to implement a zoom mode.

Unlike this, the sixth lens unit 150 and the seventh lens unit 160 may be liquid lenses. In this case, the zoom mode can be implemented by changing the focal lengths of the sixth lens unit 150 and the seventh lens unit 160 without a separate fifth driving unit 152 and sixth driving unit 162.

The first optical module 100 may comprise a fifth driving unit 152 and a sixth driving unit 162. The fifth driving unit 152 may be connected to the sixth lens unit 150, and the sixth driving unit 162 may be connected to the seventh lens unit 160. The fifth driving unit 152 may move the sixth lens unit 150 in a direction perpendicular to the optical axis. The sixth driving unit 162 may move the seventh driving unit 160 in a direction perpendicular to the optical axis.

The second optical module 200 may comprise a second lens unit 210. When the first main body 20 and the second main body 30 are foldable, the second lens unit 210 may be disposed below the first lens unit 110. At this time, the optical axis of the second lens unit 210 and the optical axis of the first lens unit 110 may be aligned. The second lens unit 210 may comprise at least one lens. In a modified embodiment of the present invention, the second lens unit 210 is described to comprise five lenses as an example, but the number of lenses of the second lens unit 210 may be variously changed.

The second optical module 200 may comprise an image sensor 220. The image sensor 220 may be disposed below or at one side of the second lens unit 210. The image sensor 220 may be disposed in a substrate (not shown). The image sensor 220 may be electrically connected to the substrate. For example, the image sensor 220 may be coupled to a substrate by a surface mounting technology (SMT). As another example, the image sensor 220 may be coupled to a printed circuit board by a flip chip technology. The image sensor 220 may be aligned so that the optical axis of the first lens unit 110 and the optical axis of the second lens unit 210 coincide with each other. That is, the optical axis of the image sensor 220, the optical axis of the first lens unit 110, and the optical axis of the second lens unit 210 may be aligned. The image sensor 220 may convert a light irradiated to the effective image area of the image sensor 220 into an electrical signal. The image sensor 220 may be any one among a charge coupled device (CCD), a metal oxide semi-conductor (MOS), a CPD, and a CID. However, the type of the image sensor 220 is not limited thereto, and the image sensor 220 may comprise any configuration capable of converting incident light into an electrical signal.

Referring to FIG. 11, when the shutter 112 is turned on and the reflective surface of the second reflecting unit 142 does not face the first beam splitter 114, the light passing through the first lens unit 110 may be incident to the second lens unit 210. At this time, the optical apparatus 10 may implement a standard (normal) mode.

Referring to FIG. 12, when the shutter 112 is turned off and the reflective surface of the second reflecting unit 142 is directed toward the first beam splitter 114, the light passing through the fifth lens unit 140 is reflected from the second reflecting unit 142 and passes through the sixth lens unit 150 and the seventh lens unit 160 sequentially, and is reflected from the first beam splitter 114 and may be incident to the second lens unit 210. At this time, the optical apparatus 10 may implement a zoom mode.

Unlike this, in a case in which the sixth lens unit 150 and the seventh lens unit 160 are liquid lenses, when the shutter 112 is turned off, and the reflective surface of the second reflecting unit 142 faces the first beam splitter 114, the light that has passed through the fifth lens unit 140 is reflected by the second reflecting unit 142 and sequentially passes through the sixth lens unit 150 and the seventh lens unit 160, and may be reflected from the first beam splitter 114 to be incident on the second lens unit 210. At this time, the optical apparatus 10 may implement a zoom mode.

According to another modified embodiment of the present invention, in the first optical module 100 being disposed in the first main body 20, a first lens unit 110, a fifth lens unit 140, a sixth lens unit 150, and a seventh lens unit 160 are disposed, and a second lens unit 210 is disposed in the second optical module 200 disposed on the second main body 20, thereby configuring one camera module that implements various optical modes, so that there is an advantage in that the size of the optical apparatus 10 can be reduced.

An optical apparatus 10 according to a modified embodiment of the present invention will be described with reference to FIGS. 13 to 15.

Referring to FIG. 13, the optical apparatus 10 may comprise a light blocking member 300 disposed between the first cover glass 22 and the second cover glass 32. When the first main body 20 and the second main body 30 are foldable, one side of the light blocking member 300 is in contact with the first cover glass 22, and the other side may be in contact with the second cover glass 32. In this case, it is possible to block the stray light flowing into the first optical module 100 and the second optical module 200 from the outside. In an embodiment of the present invention, the light blocking member 300 is described to have a ring or annular shape as an example, but is not limited thereto, and the shape of the light blocking member 300 may be variously changed.

Referring to FIG. 15, the optical apparatus 10 may comprise a seating groove 320 formed in at least one of the first cover glass 22 and the second cover glass 32. When the first main body 20 and the second main body 30 are foldable, at least a portion of the light blocking member 300 is seated in the seating groove 320, and the other portion may be in contact with the other one of the first cover glass 22 and the second cover glass 32. In this case, it is possible to block the stray light flowing into the first optical module 100 and the second optical module 200 from the outside. In an embodiment of the present invention, the stray light blocking member 300 and the seating groove 320 are described to have a ring or annular shape as an example, but are not limited thereto and the shape of the stray light blocking member 300 and the seating groove 320 may be variously changed.

Referring to FIG. 13, the optical apparatus 10 may comprise a protruded portion 300 being protruded from one of a first cover glass 22 and a second cover glass 32. When the first main body 20 and the second main body 30 are foldable, the protruded portion 300 may be in contact with the surface of the other one of the first cover glass 22 and the second cover glass 32. In this case, it is possible to block the stray light flowing into the first optical module 100 and the second optical module 200 from the outside. In an embodiment of the present invention, the protruded portion 300 is described to have a ring or annular shape as an example, but is not limited thereto, and the shape of the protruded portion 300 may be variously changed.

Referring to FIG. 14, the optical apparatus 10 may comprise a first cover glass 22 and first and second protruded portions 300 and 310 respectively being protruded from the second cover glass 32. When the first main body 20 and the second main body 30 are foldable, the first and second protruded portions 300 and 310 may be in contact with each other. In this case, it is possible to block the stray light flowing into the first optical module 100 and the second optical module 200 from the outside. In an embodiment of the present invention, the first and second protruded portions 300 and 310 are described to have a ring or annular shape as an example, but are not limited thereto, and the shapes of the first and second protruded portions 300 and 310 may be changed variously.

Referring to FIG. 15, the optical apparatus 10 may comprise a protruded portion 300 being protruded from one of the first cover glass 22 and the second cover glass 32 and a seating groove 320 formed in the other. When the first main body 20 and the second main body 30 are foldable, at least a portion of the protruded portion 300 may be seated in the seating groove 320. In this case, it is possible to block the stray light flowing into the first optical module 100 and the second optical module 200 from the outside. In the embodiment of the present invention, the protruded portion 300 and the seating groove 320 are described to have a ring or annular shape as an example, but are not limited thereto, and the shapes of the protruded portion 300 and the seating groove 320 may be changed variously.

Hereinafter, an optical apparatus according to a second embodiment of the present invention will be described with reference to the drawings.

Figure 16:
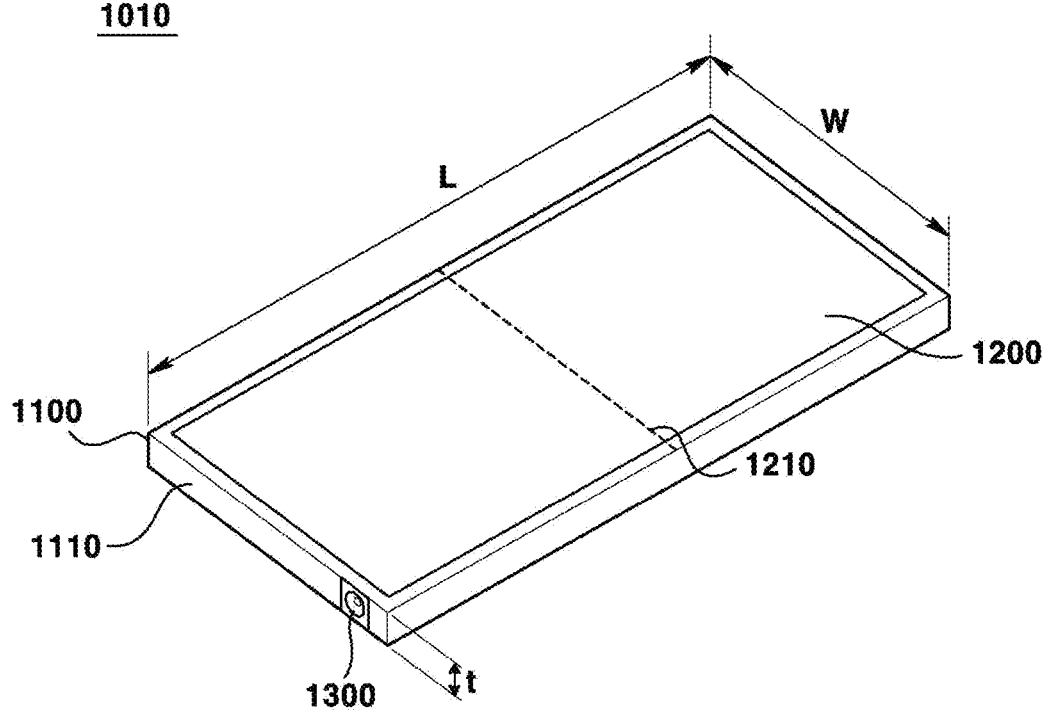
FIG. 16 is a perspective view of an optical apparatus according to a second embodiment of the present invention.
Figure 17:
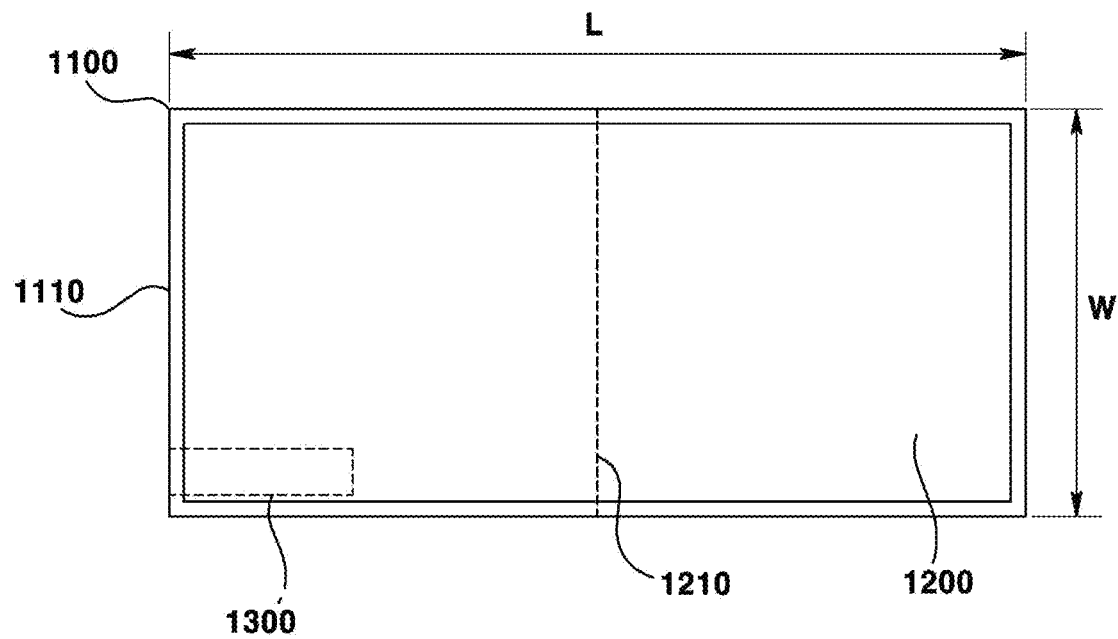
FIG. 17 is a plan view of an optical apparatus according to a second embodiment of the present invention.
Figure 18:
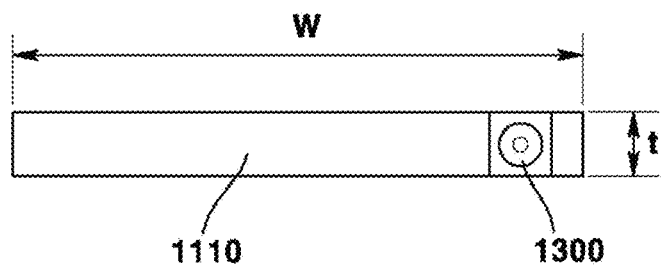
FIG. 18 is a front view of an optical apparatus according to a second embodiment of the present invention.
Figure 19:
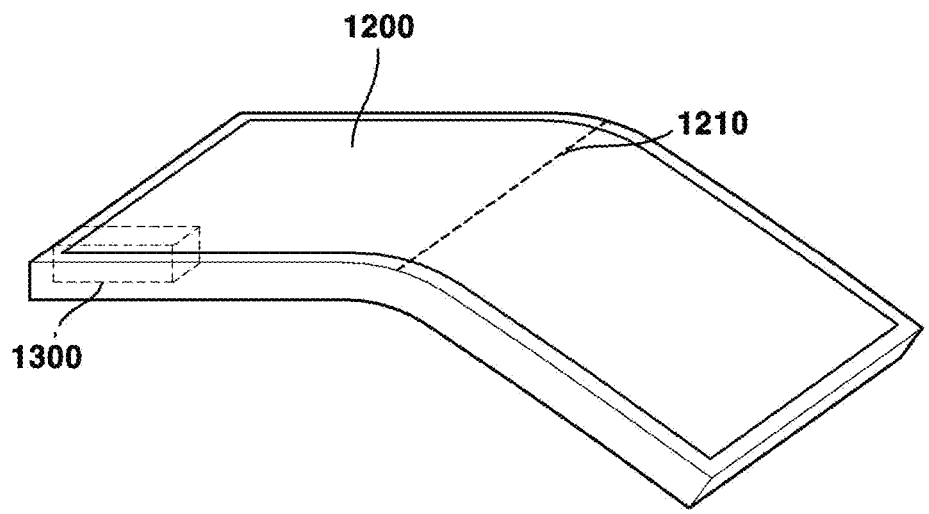
FIG. 19 is a view showing a state in which the optical apparatus according to the second embodiment of the present invention is folded.

FIG. 16 is a perspective view of an optical apparatus according to a second embodiment of the present invention. FIG. 17 is a plan view of an optical apparatus according to a second embodiment of the present invention. FIG. 18 is a front view of an optical apparatus according to a second embodiment of the present invention. FIG. 19 is a view showing a state in which the optical apparatus according to the second embodiment of the present invention is folded.

Referring to FIGS. 16 to 19, the optical apparatus 1010 according to the second embodiment of the present invention may comprise a main body 1100, a display 1200, and a camera module 1300.

The optical apparatus 1010 may be one among a hand phone, a mobile phone, a smart phone, a portable smart device, a digital camera, a laptop computer, a digital broadcasting terminal, a personal digital assistant (PDA), a portable multimedia player (PMP), and a navigation device. However, the type of the optical apparatus 1010 is not limited thereto, and any device for photographing an image or a picture may be comprised in the optical apparatus 1010.

The optical apparatus 1010 may comprise a main body 1100. The main body 1100 may form the outer appearance of the optical apparatus 1010. A display 1200 may be disposed on one surface of the main body 1100. The main body 1100 may be formed in a hexahedral shape. The main body 1100 may comprise an upper surface, a lower surface, and first to fourth side surfaces connecting the upper surface and the lower surface. At this time, it may be understood that the first side surface 1110 faces the third side surface, and the second side surface faces the fourth side surface.

The main body 1100 may be foldable. Specifically, the main body 1100 may be folded with respect to an imaginary surface parallel to the first side surface 1110 or the third side surface. At this time, the first side surface 1110 or the imaginary surface parallel to the third side surface may comprise an imaginary line 1210 on which the display 1200 is folded.

A display 1200 may be disposed on an upper surface of the main body 1100. The upper surface may face a lower surface. The upper surface of the main body 1100 may be out foldable. Specifically, the upper surface of the main body 1100 may be folded in a downward direction with respect to the imaginary line 1210 on which the display 1200 is folded. When the main body 1100 is foldable, a partial region of the lower surface of the main body 1100 and the remaining region may face each other.

The optical apparatus 1010 may comprise a display 1200. The display 1200 may output an image photographed by the camera module 1300. The display 1200 may be disposed in the main body 1100. The display 1200 may be disposed on one surface of the main body 1100. The display 1200 may be disposed on an upper surface of the main body 1100.

The display 1200 may be out foldable. At this time, the display 1200 may be folded with respect to the imaginary surface on which the main body 1100 is folded. Specifically, the display 1200 may be folded down with respect to an imaginary surface on which the main body 1100 is folded. In addition, the display 1200 may be folded with respect to an imaginary line 1210 parallel to the first side surface 1110 or the third side surface. Specifically, the display 1200 may be folded down with respect to the imaginary line 1210 parallel to the first side surface 1110 or the third side surface. In this case, the partial region and the remaining region of the display 1200 may not face each other.

The optical apparatus 1010 may comprise a cover glass (not shown). The cover glass may be disposed on an upper surface of the main body 1100. The cover glass may be disposed on one side or an upper surface of the display 1200 to inhibit damage to the display 1200. The cover glass may be out foldable together with the display 1200.

The optical apparatus 1010 may comprise a camera module 1300. The camera module 1300 may be disposed in the main body 1100. The camera module 1300 may be disposed inside the main body 1100. The lens unit of the camera module 1300 may be disposed on the first side surface 1110 or the third side surface to be exposed to the outside. That is, the surface exposed to the outside of the lens unit of the camera module 1300 may be parallel to the imaginary surface comprising the imaginary line 1210.

The camera module 1300 may be disposed adjacent to a corner region of the main body 1100. For example, the camera module 1300 may be disposed adjacent to a portion connecting the first side surface 1110 and the second side surface of the main body 1100. A subject photographed by the camera module 1300 may be displayed on the display 1200.

The camera module 1300 may be extended from the first side surface 1110 or the third side surface in a direction perpendicular to the imaginary surface comprising the imaginary line 1210. That is, the camera module 1300 may be disposed in a direction perpendicular to the imaginary line on which the display 1200 is folded. Through this, a long stroke required when the camera module 1300 implements a zoom function can be satisfied, and at the same time, there is an advantage in that the thickness of the optical apparatus 1010 can be reduced.

In addition, in an optical apparatus 1010 according to a second embodiment of the present invention, the length W of the first side surface 1110 and the third surface of the main body 1100 may be formed to have a length L longer than that of the second side surface and the fourth side surface. In this case, it is possible to secure a space that can satisfy a long stroke required when the camera module 1300 implements the zoom function.

In a second embodiment of the present invention, even when the main body 1100 and the display 1200 are folded, the subject photographed by the camera module 1300 is displayed on the display 1200, so that the user's convenience can be enhanced.

Figure 20:
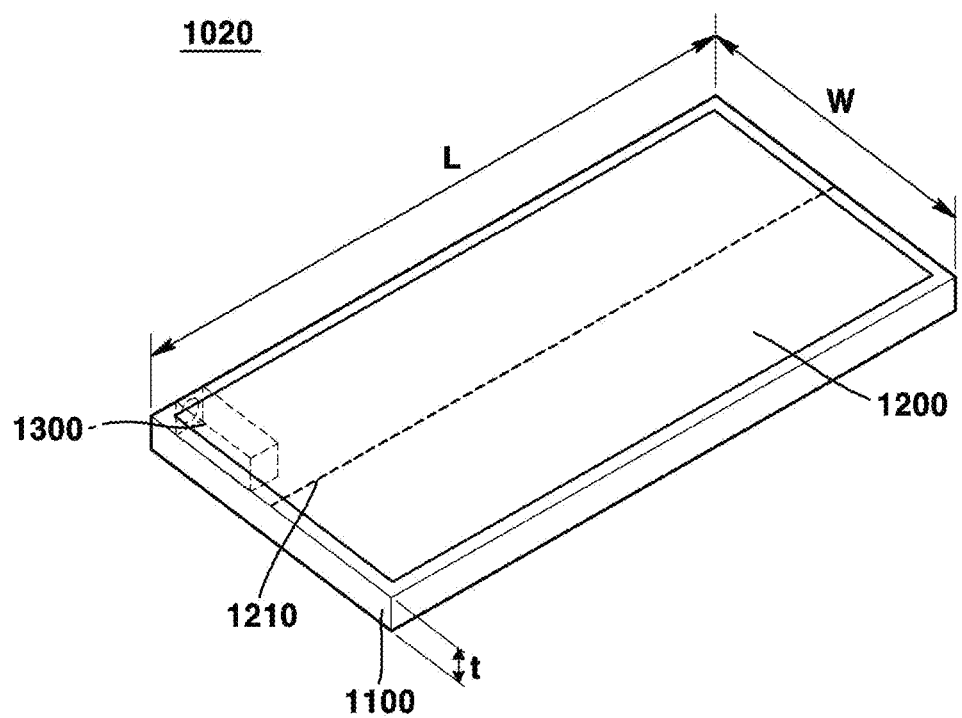
FIG. 20 is a perspective view of an optical apparatus according to a second embodiment of the present invention.
Figure 21:
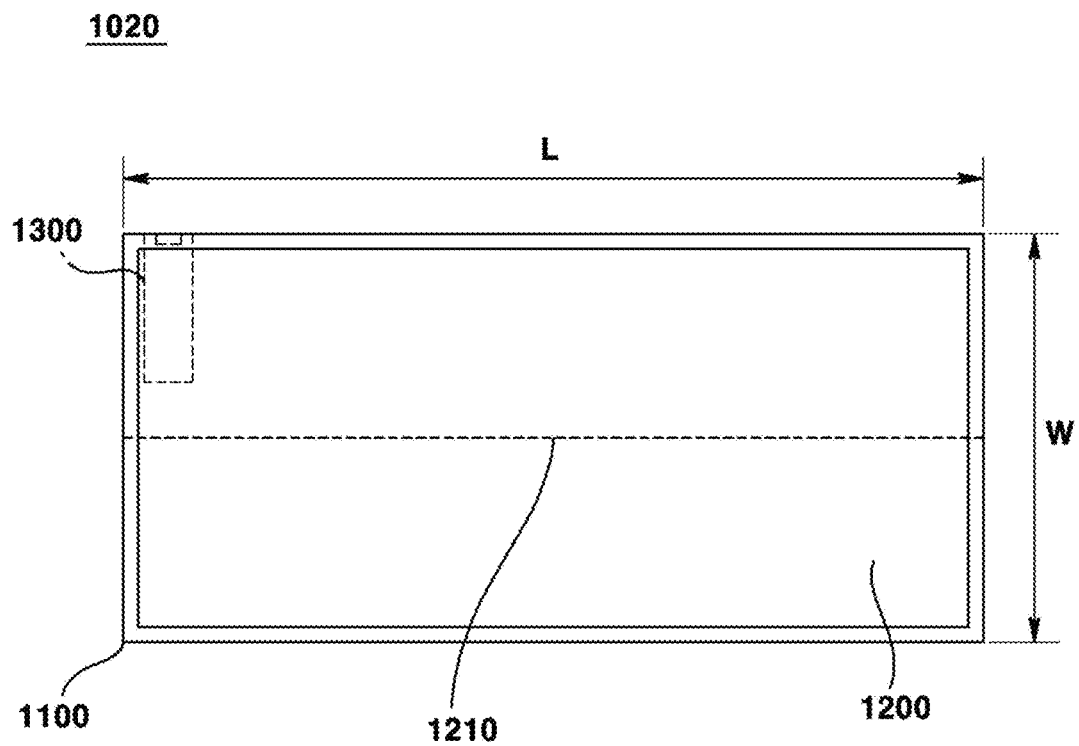
FIG. 21 is a plan view of an optical apparatus according to a second embodiment of the present invention.
Figure 22:
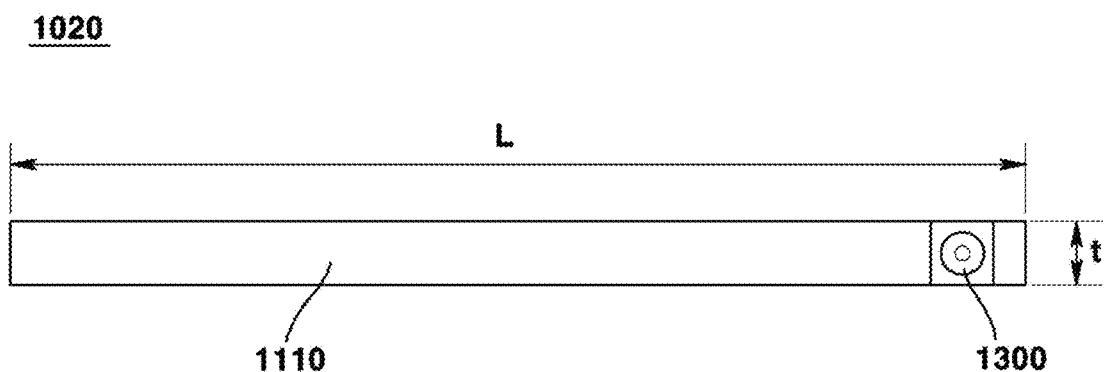
FIG. 22 is a front view of an optical apparatus according to a second embodiment of the present invention.
Figure 23:
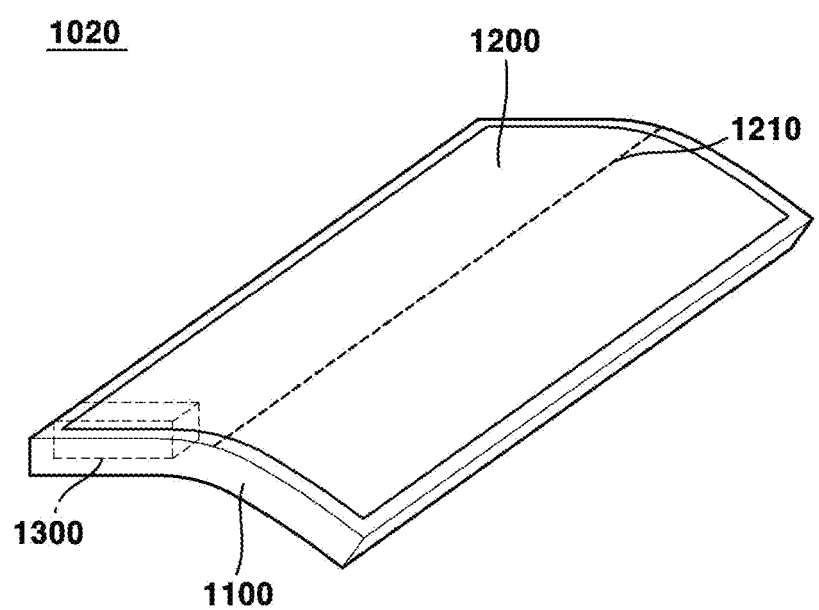
FIG. 23 is a view showing a state in which the optical apparatus according to the second embodiment of the present invention is folded.

FIG. 20 is a perspective view of an optical apparatus according to a second embodiment of the present invention. FIG. 21 is a plan view of an optical apparatus according to a second embodiment of the present invention. FIG. 22 is a front view of an optical apparatus according to a second embodiment of the present invention. FIG. 23 is a view showing a state in which the optical apparatus according to the second embodiment of the present invention is folded.

Hereinafter, differences from the optical apparatus 1010 according to a second embodiment of the present invention will be described with reference to FIGS. 16 to 19.

In the optical apparatus 1020 according to the second embodiment of the present invention with reference to FIGS. 20 to 23, the lengths L of the first side surface 1110 and the third side surface of the main body 1100 may be formed to be shorter than the length W of the second side surface and the fourth side surface. When the main body 1100 and the display 1200 are out folded, there is an advantage in that the user can easily hold the optical apparatus 1010 with both hands.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. An optical apparatus comprising:
   a first main body comprising a first cover glass;
   a second main body comprising a second cover glass and foldably connected with the first main body;
   a first optical module disposed on the first main body; and
   a second optical module disposed on the second main body,
   wherein the first optical module comprises a first lens and a third lens spaced apart from the first lens in a direction perpendicular to an optical axis direction of the first lens, and
   wherein the second optical module comprises a second lens overlapped with the first lens in the optical axis direction when the first cover glass and the second cover glass face each other.

2. The optical apparatus of claim 1,
   wherein the second optical module comprises an image sensor disposed at one side of the second lens.

3. The optical apparatus of claim 2, wherein the first optical module comprises a shutter disposed under the first lens, a first beam splitter disposed under the shutter, and a second beam splitter disposed at one side of the third lens.

4. The optical apparatus of claim 3, wherein the first optical module comprises a first driving unit configured to turn on or turn off the shutter, and a second driving unit configured to rotate a reflective surface of the second beam splitter.

5. The optical apparatus of claim 4, wherein when the shutter is on and the reflective surface of the second beam splitter does not face the first beam splitter, a light passing through the first lens is incident on the second lens, and
   wherein when the shutter is off and the reflective surface of the second beam splitter faces the third lens and the first beam splitter, a light passing through the third lens is incident on the second lens.

6. The optical apparatus of claim 4, wherein the first optical module comprises a fourth lens spaced apart from the first and third lenses in the direction perpendicular to the optical axis direction, and a first reflecting unit disposed at one side of the fourth lens.

7. The optical apparatus of claim 6, wherein the first optical module comprises a third driving unit configured to rotate the first reflecting unit.

8. The optical apparatus of claim 7, wherein when the shutter is on, the reflective surface of the second beam splitter does not face the first beam splitter, and a reflective surface of the first reflecting unit does not face the first beam splitter, a light passing through the first lens is incident on the second lens,
   wherein when the shutter is off, the reflective surface of the second beam splitter faces the third lens and the first beam splitter, and the reflective surface of the first reflecting unit does not face the first beam splitter, a light passing through the third lens is incident on the second lens, and
   wherein when the shutter is off, the reflective surface of the second beam splitter does not face the first beam splitter, and the reflective surface of the first reflecting unit faces the fourth lens and the first beam splitter, a light passing through the fourth lens is incident on the second lens.

9. The optical apparatus of claim 3, wherein the first optical module comprises a first driving unit configured to turn on or turn off the shutter, a fifth lens spaced apart from the first lens in the direction perpendicular to the optical axis direction, a second reflecting unit disposed at one side of the fifth lens, a fourth driving unit configured to rotate the second reflecting unit, sixth and seventh lenses disposed between the first lens and the fifth lens, and fifth and sixth driving units configured to move the sixth and seventh lenses in the direction perpendicular to the optical axis direction, respectively.

10. The optical apparatus of claim 9, wherein when the shutter is on and a reflective surface of the second reflecting unit does not face the first beam splitter, a light passing through the first lens is incident on the second lens, and
    wherein when the shutter is off and the reflective surface of the second reflecting unit faces the fifth lens and the first beam splitter, a light passing through the fifth lens sequentially passes through the sixth and seventh lenses to be incident on the second lens.

11. The optical apparatus of claim 1, comprising a stray light blocking member disposed between the first cover glass and the second cover glass.

12. The optical apparatus of claim 1, comprising a protruding portion protruding from one of the first cover glass and the second cover glass, and a groove formed on the other one of the first cover glass and the second cover glass, and wherein at least a portion of the protruding portion is inserted in the groove when the first cover glass and the second cover glass face each other.

13. The optical apparatus of claim 2, wherein the first cover glass comprises a first region overlapped with the first lens in the optical axis direction,
wherein the second cover glass comprises a second region overlapped with the second lens in the optical axis direction, and
wherein each of the first region and the second region has a refractive index.

14. The optical apparatus of claim 2, wherein a distance between an upper end of the first lens and the image sensor is greater than a thickness of the first main body in the optical axis direction.

15. The optical apparatus of claim 2, wherein each of the first lens and the second lens comprises a plurality of lenses.

16. An optical apparatus comprising:
a first main body comprising a first cover glass;
a second main body comprising a second cover glass and foldably connected with the first main body;
a first optical module disposed on the first main body; and
a second optical module disposed on the second main body,
wherein the first optical module comprises a first lens, a reflecting unit, and a beam splitter, and a third lens spaced apart from the first lens in a direction perpendicular to an optical axis direction of the first lens,
wherein the second optical module comprises a second lens and an image sensor, and
wherein the second lens of the second optical module is overlapped with the first lens in the optical axis direction when the first cover glass and the second cover glass face each other.

17. The optical apparatus of claim 16, wherein the third lens is disposed between the reflecting unit and the beam splitter, and
wherein the first optical module comprises third and a fourth lenses-lens between the reflecting unit and the beam splitter, and a driving unit configured to individually move the third and fourth lenses.

18. The optical apparatus of claim 16, wherein the first optical module comprises a fifth lens and a shutter disposed between the first lens and the beam splitter.

19. The optical apparatus of claim 18, wherein when the shutter is on and a reflective surface of the reflecting unit does not face the beam splitter, a light passing through the first lens is incident on the second lens.

20. An optical apparatus comprising:
a first main body comprising a first cover glass;
a second main body comprising a second cover glass and foldably connected with the first main body;
a first optical module disposed on the first main body; and
a second optical module disposed on the second main body,
wherein a light passing through the first optical module is incident on the second optical module when the first cover glass and the second cover glass face each other,
wherein the first optical module comprises a first lens and a third lens spaced apart from the first lens in a direction perpendicular to an optical axis direction of the first lens, and
wherein the second optical module comprises a second lens and an image sensor.

* * * * *